United States Patent
Caesar et al.

(10) Patent No.: US 11,712,993 B2
(45) Date of Patent: Aug. 1, 2023

(54) METHOD FOR DYNAMICALLY MONITORING A TRAILER LIGHTING SYSTEM FROM A TRACTION VEHICLE

(71) Applicant: HELLA GMBH & CO. KGAA, Lippstadt (DE)

(72) Inventors: Felix Caesar, Unterpleichfeld (DE); Matthias Deichsel, Minden (DE); Jan Schmaeling, Bad Brueckenau (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 421 days.

(21) Appl. No.: 16/950,554

(22) Filed: Nov. 17, 2020

(65) Prior Publication Data

US 2021/0061172 A1    Mar. 4, 2021

Related U.S. Application Data

(63) Continuation of application No. PCT/EP2019/061684, filed on May 7, 2019.

(30) Foreign Application Priority Data

May 17, 2018    (DE) .................... 10 2018 111 882.1

(51) Int. Cl.
*B60Q 11/00* (2006.01)
*H05B 45/58* (2020.01)
(Continued)

(52) U.S. Cl.
CPC .............. *B60Q 1/305* (2013.01); *B60D 1/62* (2013.01); *B60Q 11/005* (2013.01); *H05B 45/50* (2020.01);
(Continued)

(58) Field of Classification Search
CPC ........ H05B 47/20; H05B 45/59; H05B 45/58; B60Q 11/005
See application file for complete search history.

(56) References Cited

U.S. PATENT DOCUMENTS

| 6,392,553 B1 | 5/2002 | Mollet et al. |
| 2007/0057676 A1 | 3/2007 | Bourgeois |
| 2016/0209452 A1 | 7/2016 | Dome et al. |

FOREIGN PATENT DOCUMENTS

| DE | 60302434 T2 | 8/2006 |
| DE | 102005051212 A1 | 5/2007 |

(Continued)

OTHER PUBLICATIONS

International Search Report dated Aug. 29, 2019 in corresponding application PCT/EP2019/061684.

*Primary Examiner* — Joseph L Williams
(74) *Attorney, Agent, or Firm* — Muncy, Geissler, Olds & Lowe, P.C.

(57) ABSTRACT

A method for monitoring, from a traction vehicle, a lighting system of a trailer with first lights having at least one brake light, at least one right tail light, at least one left tail light, at least one rear fog light and/or at least one reversing light, wherein the first lights are supplied with electricity from the traction vehicle via electric circuits, and wherein during the monitoring of the lighting system of the trailer, each of the first lights is periodically checked with a first waiting time, the check determining whether the electric circuit having the first light to be checked is closed or not, wherein the first waiting time between two checks of one of the first lights is extended incrementally starting from an initial value for each individual first light if the electric circuit through this first light is not interrupted.

10 Claims, 1 Drawing Sheet

(51) Int. Cl.
*H05B 47/20* (2020.01)
*B60Q 1/30* (2006.01)
*B60D 1/62* (2006.01)
*H05B 45/50* (2022.01)
*H05B 45/59* (2022.01)

(52) U.S. Cl.
CPC ............ *H05B 45/58* (2020.01); *H05B 45/59* (2022.01); *H05B 47/20* (2020.01)

(56) References Cited

FOREIGN PATENT DOCUMENTS

| | | |
|---|---|---|
| DE | 202007007776 U1 | 8/2007 |
| DE | 102008044666 A1 | 3/2010 |
| DE | 102016221695 A1 | 5/2018 |
| EP | 1830607 A1 | 9/2007 |

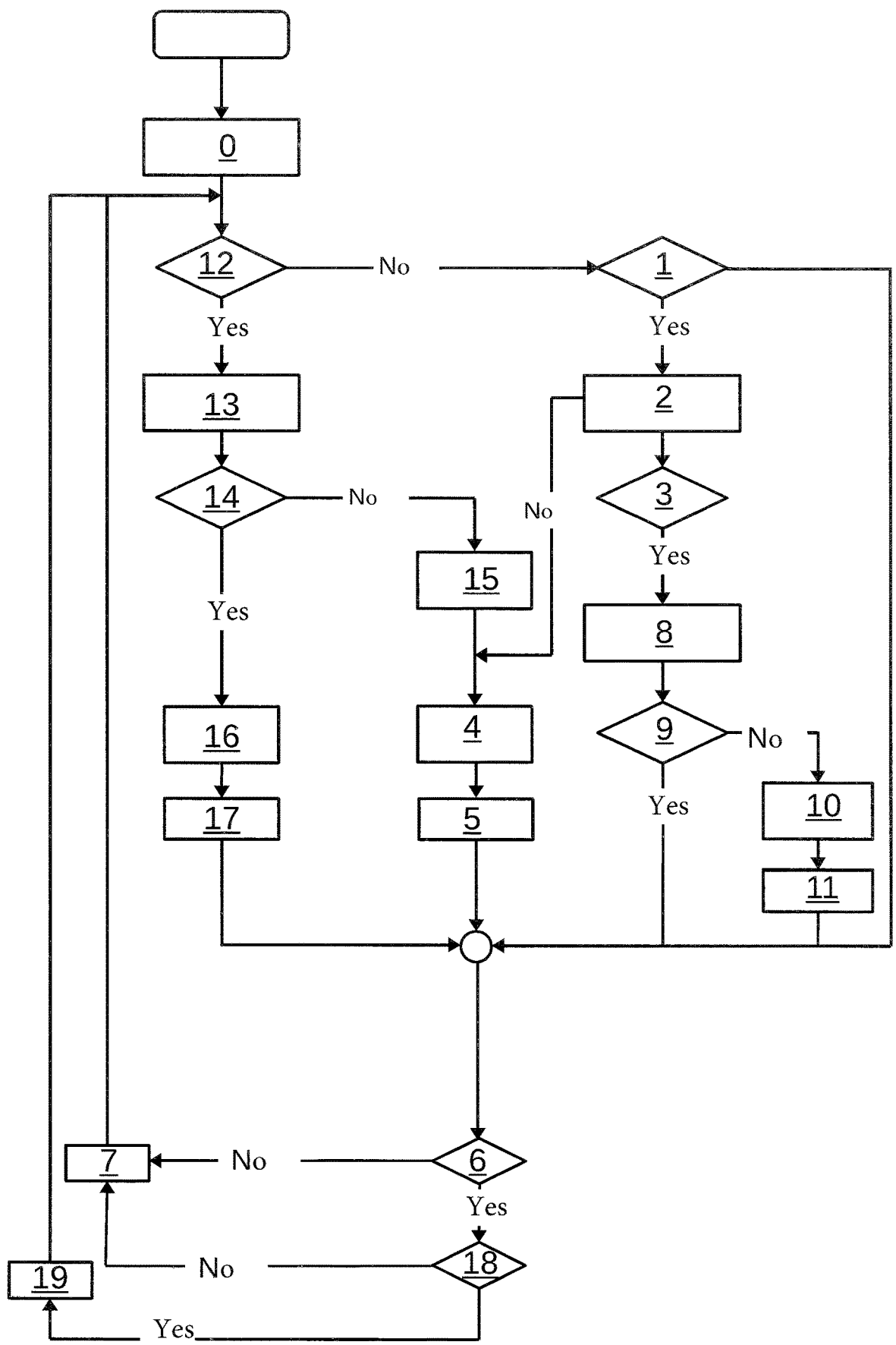

METHOD FOR DYNAMICALLY MONITORING A TRAILER LIGHTING SYSTEM FROM A TRACTION VEHICLE

This nonprovisional application is a continuation of International Application No. PCT/EP2019/061684, which was filed on May 7, 2019, and which claims priority to German Patent Application No. 10 2018 111 882.1, which was filed in Germany on May 17, 2018, and which are both herein incorporated by reference.

BACKGROUND OF THE INVENTION

Field of the Invention

The present invention relates to a method for monitoring a lighting of a trailer with first lights comprising at least one brake light, at least one right tail light, at least one left tail light, at least one rear fog light, and/or at least one backup light from a towing vehicle, wherein the first lights are supplied with power via circuits from the towing vehicle, and for monitoring the decoupling of the trailer from the towing vehicle.

Description of the Background Art

A method for monitoring the lighting of the trailer is known in which each of the first lights is checked periodically with an individual first waiting time. In this case, it is checked whether the circuit with the first light to be checked is closed or not.

The monitoring of the first lights can be carried out, for example, in the following two ways: a measurement is carried out cyclically when a light is switched on (warm monitoring). In this case, the activation by the control unit of the towing vehicle is briefly interrupted (about 1 ms) and a test pulse is sent on the supply line to the light. This method is used with LED lights and incandescent lights. The brief interruption of the supply voltage leads to a brief interruption of the luminous flux, which is also known as dark flashing; or a measurement is carried out cyclically when a light is switched off (cold monitoring). In this case, a test pulse is sent via the supply line to the light. When incandescent bulbs are used, no visible pulse is generated. In contrast, the application of the test pulse of 1 ms to LED lights leads to a visible and annoying flash (bright flash). Cold monitoring should therefore not be carried out with LED lights. It can, however, be carried out on lights with incandescent bulbs.

Both methods are used to monitor the trailer's lighting system.

The following problem arises with the cyclical warm monitoring of LED lights: Due to the dark flashing in the course of switching off and measuring, a flickering is visible in the near field of the LED lights. Depending on the type of LED light and the electronics used therein, the flickering can also be seen from a greater distance. The flickering is particularly noticeable in the tail light and brake light, because these can be active for a rather long period of time. The cyclical repetition of the dark flashing reinforces the impression of flickering.

SUMMARY OF THE INVENTION

It is therefore an object of the present invention to reduce this flickering.

This object is achieved by gradually extending the first waiting time between two checks of one of the first lights for each individual first light starting from an initial value, if the circuit with these first lights is OK. By extending the first waiting time, the time interval between two dark flash pulses of a first light is increased. As a result, the impression of flickering of the first lights can be reduced or disappear completely.

The gradual extension of the first waiting time can occur up to a maximum duration of the first waiting time, which can be selected so that the checking of the trailer lighting occurs so frequently that faults in the trailer lighting are noticed quickly enough.

It is also possible that an extended first waiting time is shortened. A shortening of the first waiting time, in particular a shortening of the first waiting time to the initial value, therefore the resetting of the first waiting time to the initial value, is possible in particular between two checks of one of the first lights, if instead of a closed circuit with this first light, a circuit interruption is detected. It can be ensured in this way that if one or all of the first lights are abnormal, they are monitored more closely in order to quickly notice further failures of the lighting.

An interruption of a circuit across one of the first lights or with one of these first lights can have different causes. One possibility is that the circuit interruption is caused by a defect in the first light. It could also be that the lines to the first light or from the first light are damaged. But it is also possible that a trailer is decoupled from the towing vehicle. This case of decoupling, in which circuits across the lights are opened, must be detected in order to distinguish it from a defect in one of the lights.

In particular, in order to be able to narrow down the cause of the open circuit across the first light or with the first light, if a circuit interruption is detected instead of a closed circuit with a first light, the decoupling of the trailer from the towing vehicle can be monitored.

Regardless of the reason why this is carried out, it can be tested periodically during the trailer decoupling monitoring with a second waiting time whether the circuits with the first lights are closed or not. The second waiting time is preferably shorter than the initial value for the first waiting times. It is achieved thereby that the trailer coupling monitoring is carried out quickly as soon as an open circuit has been detected.

The trailer decoupling monitoring can be terminated if one of the checks of the trailer decoupling monitoring reveals that one of the circuits with one of the first lights is uninterrupted. If one of the circuits with one of the first lights is uninterrupted, the trailer cannot be decoupled. Further trailer decoupling monitoring is then unnecessary. Instead, the monitoring of the lighting can be continued with the first waiting period.

If, however, the check of the first lights has revealed that all circuits across the first lights are interrupted, the trailer decoupling monitoring can be continued according to the invention by also checking whether circuits with lights in the direction indicators of the trailer (flashing lights or flashers) are interrupted or not. If the check of the circuit of one of the lights of one of the direction indicators reveals that the circuit is not interrupted, the trailer decoupling monitoring can be terminated according to the invention, because then there can be no decoupling. The monitoring of the lighting can then be continued with the first waiting period.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole FIGURE shows a flowchart of a method of the invention for monitoring the lighting of a trailer.

DETAILED DESCRIPTION

The trailer, the lighting of which is monitored, has a right tail light, a left tail light, a brake light, a backup light, a rear fog light, a right direction indicator, and a left direction indicator. The lighting is supplied with power from the towing vehicle via a cable connection. The lighting of the trailer is monitored from this towing vehicle using a method of the invention. When the lighting is monitored, it is repeatedly checked whether circuits across the lights are closed or may be closed. According to a method of the invention, as shown in FIG. 1, this monitoring can only be carried out for all lights or part of the lights, for example, for the right tail light, the left tail light, the brake light, the backup light, and the rear fog light. These five lights are combined below under the term first lights.

The methods for monitoring the lighting and the decoupling of the trailer can be executed by means of a control device of the towing vehicle.

A method of the invention for monitoring the lighting of the trailer coupled to a towing vehicle can begin by first defining a first waiting time in an initialization step 0 for each first light, by which monitoring cycles are defined for each first light. In the example shown in the FIGURE, these first waiting times are the same during initialization and are set to 140 ms. The first waiting times could also be set individually for each of the first lights. The initial values for the first waiting times can also differ from first light to first light. It is possible in addition that the first waiting times are changed when the method is carried out, specifically differently for each first light.

According to the method of the invention, testing of a first light is always carried out if a time longer than the time period of the first waiting time has passed since the monitoring of this first light. In the ideal case, the first lights are monitored after the first waiting times have elapsed. In practice, however, longer pauses can occur if, during the execution of the method steps, the testing of another first light or possibly the monitoring of the decoupling of the trailer from the towing vehicle has not yet been completed.

It is shown first of all how the monitoring of the first lights takes place if the first lights are in closed circuits; therefore, no open circuit is detected during the monitoring. For this purpose, a first of the first lights is specified which is checked.

Because LED lights can only be checked when they are switched on, the checking of a switched-off LED light is skipped and the method moves on to checking the next first light. An incandescent light is monitored in every switching state. After an initialization, it is checked in a step 1 whether the first light to be tested is an incandescent light or a switched-on LED light. If this is the case, after the first waiting time has elapsed since the last check of the first light to be tested, a measurement is carried out (step 2) in order to determine whether the circuit with this first light is interrupted or not. This can be done, for example, by means of a test pulse and the detection of the response to the test pulse, or in another manner familiar to the skilled artisan. If necessary, further steps with measurements on the first light to be tested could also be carried out in order to determine the properties of the first light.

If the measurement finds that the circuit is closed, i.e., OpenLoad (=OL)=No (step 3), it is assumed that the tested first light is OK. A further test of the first light can then take place later than was specified by the initial value for the first waiting time. The first waiting time is then increased in step 4. In the example in the FIGURE, the increase in the first waiting time is 50 ms, wherein it is specified in the example that the first waiting time may not be longer than 500 ms.

In the example it is then provided that it is entered in a memory of the control device that the tested first light is OK (step 5).

In step 6 it is then checked whether the previous test of the first lights had found that all first lights are in an open circuit. As long as it has been saved for at least one of the first lights that it is in a closed circuit, the monitoring of the lighting continues. The next first light to be tested is then determined (step 7). If the first waiting time for this light has expired, it is also then queried at this time whether the first light is a switched-on LED light or an incandescent light (step 1). If one of the two alternatives applies and it is true that the first light to be tested is in a closed circuit, steps 2 to 6 are executed as described and at the end of the sequence of steps, the next first light to be tested is determined again in step 7. When all first lights have been tested, testing of the first light is started again.

If, however, it is determined in step 3 for a first light that it is in an open circuit, the sequence of steps described above is exited. Different states can then be present: For example, the tested first light may be defective and is therefore in an open circuit or there is no electrical connection between the towing vehicle and the trailer. In a step 8, the first waiting time for this light is then initially set to the initial value, 140 ms in the example. It is then checked in the memory whether or not this light was already in an open circuit in the last check (step 9).

If this was not the case, therefore, it is new that the circuit across the tested light has been interrupted, a memory flag with the designation "TrailerDisconnection" is set to the value "True" (step 10). This means that there is a possibility that the electrical connection between the trailer and the towing vehicle is disconnected. In step 11, it is also marked in the memory of the control unit that the circuit with the tested light was open.

If, in contrast, the circuit with the tested light was already interrupted in the last check, the method steps explained below also specify that there is a defect in the light and not a disconnection of the connection.

The check, if necessary following step 11, as to whether a disconnection is present or not (monitoring of the decoupling), is to be made according to the exemplary method of the invention according to the FIGURE. The monitoring of the decoupling begins after steps 6 and 7 have been completed. This begins if it was determined in step 12 that the "TrailerDisconnection" flag has the value "True." This is the case because this flag was set in step 10. Otherwise, the lighting monitoring is continued.

If the flag has the value "True," after a second waiting time of 20 ms in the example (step 13), it is measured whether the current first light selected when step 7 was last run is in an open circuit. If the test (step 14) reveals that the tested first light is in a closed circuit, the trailer is connected to the towing vehicle. There is no disconnection. The first lights for which an open circuit was entered in the control unit's memory are then defective. The "TrailerDisconnection" flag is then set to the value "False" in step 15, because there is a connection between the trailer and the towing vehicle. For the first light tested last, the first waiting time can be increased by 50 ms (step 4). It is entered in the memory that the circuit is closed (step 5). The method is then returned to monitoring the first light and has terminated the monitoring of the decoupling because it has become unnecessary.

If, in contrast, it is determined in step 14 that the circuit with the tested first light is open, a disconnection cannot be ruled out. But it is also possible that the first light tested is defective. A further check is necessary. In a step 16, the first waiting time for the tested light is reset to the initial value before a further check. In step 17, the circuit across the tested light is marked as open. The "TrailerDisconnection" flag remains set to "True."

After steps 6 and 7 have been completed, the next first light is tested in step 13. If the circuit with the tested light is closed, the decoupling check can be terminated and the lighting check continued (steps 15, 4, 5 and the following steps).

If the check in step 13 reveals that this tested first light is also in an open circuit, the first waiting time is set to the initial value for this first light as well (step 16) and the circuit of this light is marked as open in the memory (step 17). The "TrailerDisconnection" flag remains set to "True."

If, in the method of the invention, especially after step 11 or 17, it should emerge that the circuits of all first lights are marked as open in the memory (step 6), the trailer or at least the electrical connection to the trailer could be disconnected or all first lights could be defective.

If in addition the "TrailerDisconnection" flag is then still set to "True" (step 18), which is the case after step 11 or 17, a trailer disconnection can then be ruled out if the direction indicators that have not yet been tested are in closed circuits in a check. If, in contrast, the direction indicators are in open circuits, a trailer disconnection is very likely.

Therefore, after step 18, if the "TrailerDisconnection" flag is set to "True," a first of the two direction indicators is first selected as the next light to be checked (step 19). The checking of the decoupling is then continued with steps 12, 13, and 14. If the check were to reveal (step 14) that the first direction indicator is in a closed circuit, the checking of the decoupling is terminated (steps 15, 4, 5). If, in contrast, the check in step 14 were to reveal that the first direction indicator is in an open circuit, the decoupling check is continued with the checking of the second direction indicator (steps 16, 17, 6, 18, 19, 12, 13, and 14).

If the check of the second direction indicator were to reveal that it is in a closed circuit, there is an electrical connection between the towing vehicle and the trailer and the monitoring of the decoupling can be terminated.

If, in contrast, the check of the second direction indicator were to reveal that it is in an open circuit, there is a very high probability that there is a disconnection. The monitoring of the decoupling is continued, wherein then first the first lights and then the direction indicators are checked one after the other.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for monitoring a lighting of a trailer with first lights from a towing vehicle, the first lights including at least one brake light, at least one right tail light, at least one left tail light, at least one rear fog light, and/or at least one backup light, the method comprising:
   supplying first lights with power via circuits from the towing vehicle;
   during the monitoring of the lighting of the trailer, each of the first lights is periodically checked with a first waiting time, for which purpose it is checked whether the circuit with the first light to be tested is closed or not; and
   extending gradually the first waiting time between two checks of one of the first lights for each individual first light starting from an initial value, if the circuit with this first light does not have a circuit interruption.

2. The method according to claim 1, wherein the gradual extension occurs up to a maximum duration of the first waiting time.

3. The method according to claim 1, wherein the first waiting time between two checks of one of the first lights is reset to the initial value if, instead of a closed circuit with this first light, a circuit interruption is detected.

4. The method according to claim 3, wherein if, a circuit interruption is detected instead of a closed circuit with this one first light, the monitoring of the lighting is interrupted and the monitoring of the trailer decoupling is carried out.

5. The method according to claim 4, wherein during the trailer decoupling monitoring, it is checked periodically with a second waiting time whether one of the circuits with one of the first lights is closed or not.

6. The method according to claim 5, wherein the second waiting time is shorter than the initial value for the first waiting time.

7. The method according to claim 5, wherein the trailer decoupling monitoring is terminated and the monitoring of the lighting is continued if a check when the trailer decoupling monitoring is carried out reveals that one of the circuits with one of the first lights is uninterrupted.

8. The method according to claim 5, wherein after the check of the first lights has revealed that all circuits with the first lights are interrupted, the trailer decoupling monitoring is continued by also checking whether circuits with lights in the direction indicators of the trailer are interrupted or not.

9. The method according to claim 8, wherein the trailer decoupling monitoring is terminated and the monitoring of the lighting is continued if the check of the circuit of one of the lights of the direction indicators of the trailer reveals that the circuit is not interrupted.

10. The method according to claim 9, wherein the trailer decoupling monitoring starts again with the monitoring of the first lights, if the circuits with the lights of the direction indicators of the trailer for displaying the direction of travel are also interrupted.

* * * * *